Aug. 21, 1928.
C. S. SNAVELY
LIGHT SIGNAL
1,681,792
Filed March 8, 1923   2 Sheets-Sheet 1
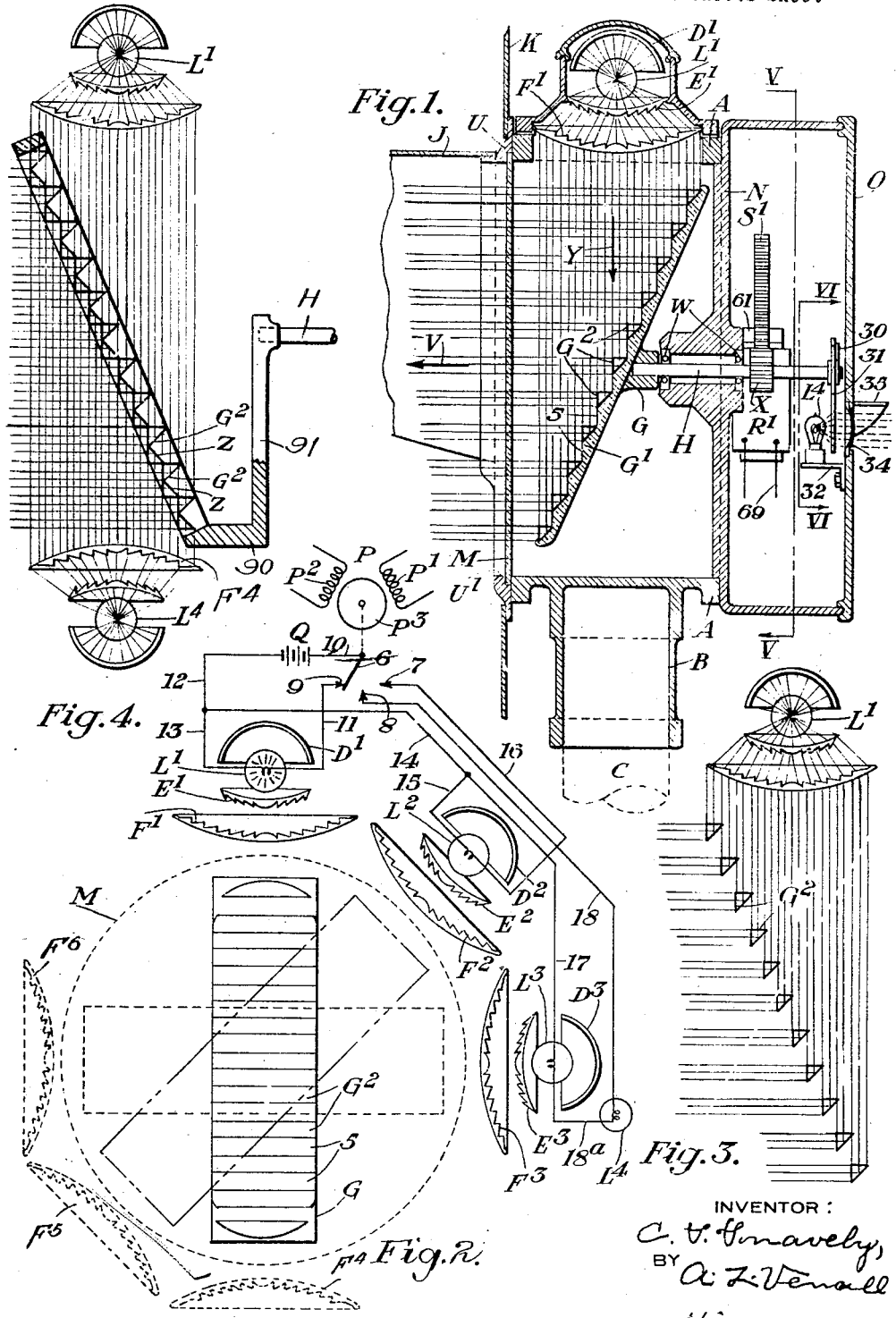
INVENTOR:
C. S. Snavely,
BY A. L. Venable
His ATTORNEY Aug. 21, 1928.

C. S. SNAVELY 1,681,792

LIGHT SIGNAL

Filed March 8, 1923

2 Sheets-Sheet 2

INVENTOR:
C. S. Snavely
BY A. L. Venable
His ATTORNEY

Patented Aug. 21, 1928.

1,681,792

UNITED STATES PATENT OFFICE.

CLARENCE S. SNAVELY, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

LIGHT SIGNAL.

Application filed March 8, 1923. Serial No. 623,755.

My invention relates to light signals.

I will describe one form of light signal embodying my invention, and will then point out the novel features thereof in claims.

Figure 5:
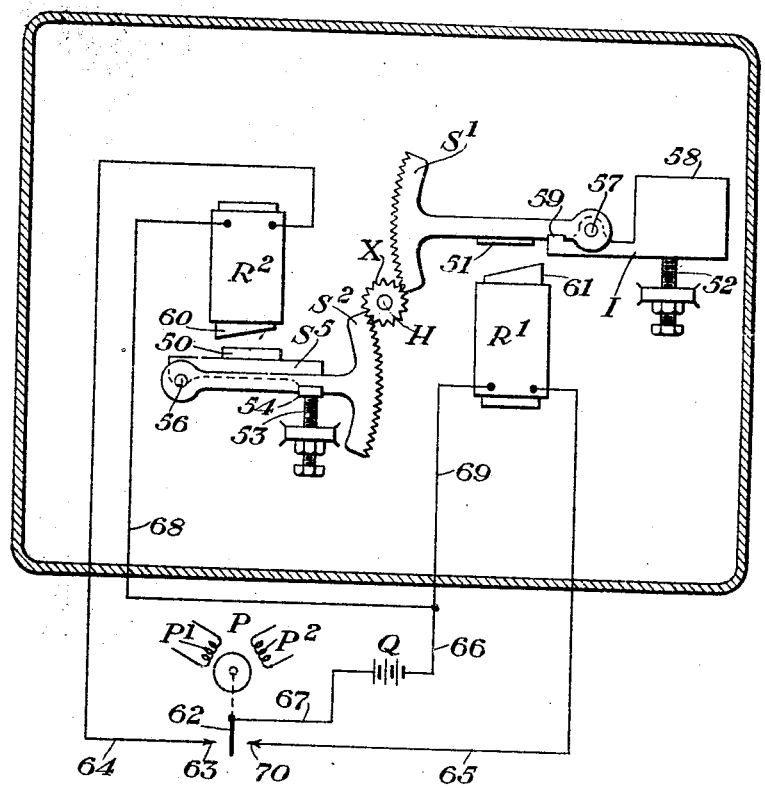
Figure 6:
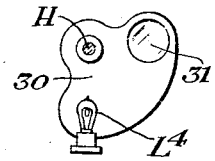

In the accompanying drawing, Fig. 1 is a vertical longitudinal sectional view showing one form of light signal embodying my invention. Fig. 2 is a view illustrating diagrammatically, the optical arrangement used in the signal shown in Fig. 1, and also showing one form of electrical apparatus which may be used in connection with said signal. Figs. 3 and 4 are fragmental views, showing in vertical section, alternative forms of light deflecting devices of which may be used in the signal shown in Fig. 1 and also embodying my invention. Fig. 5 is a vertical sectional view along line V—V in Fig. 1, looking in the direction of the arrows but showing the parts in the positions corresponding to a stop indication. Fig. 6 is a vertical sectional view along line VI—VI in Fig. 1 looking in the direction of the arrows.

Similar reference characters refer to similar parts in each of the several views.

Referring first to Fig. 1, the signal comprises a suitable casing A which contains the operating mechanism of the signal and is provided with a socket B for mounting on a mast C. This casing is further provided with a front plate U having an aperture U' fitted with a cover glass M. Supported by this front plate and partially surrounding this cover glass is a shield J, one function of which is to protect the cover glass from the direct rays of the sun and thus prevent glare due to surface reflection. Surrounding the front plate U and supported thereby is a screen K, usually of sheet metal, one function of which is to provide a uniform background for the signal indication and hence increase its visibility. The color of this screen K is preferably, though not necessarily, black.

As shown in the drawing, the signal comprises a source of light, as a lamp L' provided with a reflector D' and a pair of lenses E' and F' whereby a beam of parallel rays of light is projected vertically downward from lamp L toward the center of the casing. The signal also comprises two other lamps $L^2$ and $L^3$ one of which, $L^3$, is provided with a reflector $D^3$ and a pair of lenses $E^3$ and $F^3$ for projecting a beam of parallel rays of light horizontally from lamp $L^3$ toward the center of the casing while the other lamp $L^2$ is provided with a reflector $D^2$ and lenses $E^2$ and $F^2$ for projecting from lamp $L^2$ toward the center of the casing a beam of parallel rays of light which beam is directed at 45 angular degrees with respect to the beams issuing from lamps L' and $L^3$. The optical projecting devices are so adjusted that the paths of all three beams lie in one plane which is substantially parallel to the plane of the cover glass M, and are so directed that their axes intersect in a point immediately behind the center of this cover glass. The signal is also provided with an auxiliary lamp $L^4$ whose purpose will appear hereinafter.

The lamps L', $L^2$ and $L^3$ are so controlled that one only is lighted at a time. As shown in the drawing this control is accomplished by means of a relay P having two energizing windings P' and $P^2$ and a rotor element $P^3$. This rotor $P^3$ operates a movable contact finger 6 in the usual and well known manner. The energization of the windings P' and $P^2$ is accomplished in any suitable manner as is well understood by those skilled in the art. Lamp L' is provided with a circuit which passes from a source of energy as a battery Q, through wire 10, contact 6—9 of relay P, wire 11, lamp L' and wires 13 and 12 back to battery Q. Lamp $L^2$ is provided with a circuit which passes from battery Q through wire 10, contact 6—7 of relay P, wire 16, lamp $L^2$, and wires 15, 14 and 12 back to battery Q. Lamp $L^3$ is provided with a circuit which passes from battery Q through wire 10, contact 6—8 of relay P, wire 18, lamp $L^4$, wire $18^a$, lamp $L^3$, and wires 17, 14 and 12 back to battery Q. It is therefore evident that lamp L', $L^2$ or $L^3$ will be lighted only when the left hand contact, the right hand contact or the back contact, respectively, of relay P is closed. The beams of light issuing from these three sources may be given distinctive colors for specific signal indications by means of colored lenses placed in the paths of the beams. For example the lenses E', $E^2$ and $E^3$ may be of distinctively colored glass thus making the beams from lamp L', green, the beam from $L^2$, yellow, and the beam from lamp $L^3$, red, corresponding to indications of "proceed", "caution", or "stop", respectively.

The signal is provided with means for redirecting these beams of light so as to project them from the cover glass in the direction indicated by arrow V. The whole signal is mounted in such a position that the beam thus issuing from the signal is directed toward the point or points from which the indication displayed by the signal is to be observed. As shown in the drawing, the beams are thus redirected by means of a light deflector G having an inclined body G' provided with a plurality of transversely extending prisms $G^2$ which are of such shape and are so disposed that the light incident upon them in the direction of the arrow Y is redirected through the cover glass in the direction of arrow V. If desired plain glass or metallic reflectors could be used in place of the prismatic structure shown in the drawings. As shown in the drawing the deflector is so located as to deflect the beam from the lamp L' in the manner just described. The prisms $G^2$ are spaced vertically thus exposing non-deflecting surfaces 5 between these prisms. The result is that to an observer the signal indication is a rectangle elongated vertically and defined by alternate bright and dark bands or strips which correspond to the prisms $G^2$ and the non-deflecting surfaces 5 of the deflector G. The appearance of the signal when the deflector is in a position corresponding to the caution indication is best shown by dash and dot lines in Fig. 2 in which the dotted circle indicates the relative positioning of the cover glass. In order to deflect rays received from lamp $L^3$ the deflector must be moved through 90 angular degrees till it assumes the position shown by the dotted lines in Fig. 2. In this case the lighted rectangle displayed by the signal is elongated horizontally. For deflecting light from lamp $L^2$ through the objective the deflector G must assume the position shown by the dash and dot lines in Fig. 2. In this position the indication of the signal is a rectangle having its longest axis at 45 angular degrees with the horizontal.

Although I have shown in the drawings a particular form and arrangement of the prisms $G^2$ it is understood that various other combinations may be used to meet special conditions, for instance different numbers and sizes and spacings of prisms. Under certain conditions it may also be desired to space these prisms irregularly, arranging them so as to be more widely spaced near the center of the deflector and less widely spaced adjacent the extremities. One advantage of this arrangement is that the position of the deflector is thus made visible at longer range. Still another modification is to use only two prisms spaced at the extremities of the deflector and thus defining the position of such deflector at greatly increased distances by decreasing halation.

Since the colors of the three beams are different it follows that the signal indication combines color and position signaling. In the structure illustrated the positions and colors are arranged to correspond respectively with the aspects of the three position upper quadrant day and night indications in common practice.

One advantage of this is that the signal indication may be correctly read by persons partially or completely color blind.

Another advantage is that in case one or more of the lamps L', $L^2$ and $L^3$ are burned out the indication can still be interpreted by the position of the deflector.

Under certain conditions it is desirable that an observer, stationed at a point in rear of the signal, as for example on a train which has passed the signal moving in the direction in which the signal governs, be able to ascertain whether the signal is displaying a stop indication.

As shown in the drawing this is accomplished as follows: The back plate O of the mechanism case is provided with a hole fitted with a lens 34. This lens is protected by a shield 35 in the same manner that cover glass M is protected by shield J. The auxiliary lamp $L^4$ is supported, by some suitable means such as a bracket 32, on back wall O. Interposed between lamp $L^4$ and lens 34 is an opaque screen 30 provided with a red or clear glass roundel 31 so disposed as to project a beam of red or white light from lamp $L^4$ through lens 34 only when deflector G is in the position corresponding to a stop indication. It is clear that this back light provides a positive check on the signal indication since to project a light from lens 34, lamp $L^3$ must be lighted and the deflector G must be in the operative position with respect thereto.

The deflector is arranged to be moved to the operative position for the lamp then lit by means of a shaft H which is rigidly attached to the deflector G. This shaft is journalled in ball bearings W in a plate N which forms the back wall of the signal casing and the front wall of a mechanism box which is used to protect apparatus for rotating this shaft and thus moving the deflector to the required positions. As shown in Fig. 5 this apparatus comprises two tractive magnets R' and $R^2$ and a segmental gear associated with each such magnet and meshing with the pinion X as shown at S' and $S^2$. Segmental gear S' is pivotally supported at point 57 while segmental gear $S^2$ is pivotally supported at point 56. Pivoted also at point 56 is a member 55 having an armature 50 adapted to be operated by magnet $R^2$ and a lip 54 for engaging the lower side of segmental gear $S^2$. Downward motion of this member is limited by a screw stop 53. Segmental gear S' is provided on its lower edge with an armature 51 adapted to be operated by magnet R'.

A biasing member I is also pivotally supported at the point 57 and is provided with a weight 58 and a lip 59. The force of gravity on this weight normally tends to force weight 58 downwards until it abuts against stop screw 52, thus causing lip 59 to engage segmental gear S' and bias the moving parts of the entire system to the position shown in the drawing.

The energization of the magnets R' and R² is controlled by the same relay P as lamp L', L² and L³. This magnet R² is provided with a circuit which passes from battery Q, through wire 67, contact 62—63 of relay P, wire 64, magnet R², and wires 68 and 66 back to battery Q. Magnet R' is provided with a circuit which passes from battery Q through wire 67, contact 62—70 of relay P, wire 65, magnet R', and wires 69 and 66 back to battery Q.

The operation of the apparatus is as follows: As shown in Fig. 5 all the parts are in the position corresponding to a "stop" indication. Now if the relay P is energized in such a direction as to close contact 62—63, magnet R² becomes energized thus moving the armature 50 upward. This motion causes lip 54 to engage segmental gear S² which gear swings about pivot 56 and causes pinion X to rotate in a clockwise direction as viewed in Fig. 5. It is clear that this motion causes segmental gear S' to move downward against the bias exerted by weight I till armature 50 abuts against pole face 60 of magnet R². In this position the deflector has been rotated 45 angular degrees and now displays a "caution" indication. If now relay P is energized in such a direction as to close contact 62—70 magnet R' is energized thus drawing armature 51 downward until it engages pole face 61 of magnet R' in which position the deflector is so disposed as to display a "proceed" indication.

In the railway signals hitherto proposed it has been difficult or impossible to provide proper intensities of signal beams for long range visibility and at the same time to accomplish very short range indications by optical means. In my invention the short range indication is accomplished as follows: I prefer to paint or otherwise color the inside of the signal casing with some dark pigment as black and to paint the surface 5 of the deflector with some contrasting pigment as white. Since the cover glass M is transparent this series of strips will be perfectly visible for short distances and thus the position of the deflector serves as a signal indication.

If desired an auxiliary light source may be added inside the case thus rendering the mechanical form of the deflector visible at nights and giving indications by mechanical position of deflector both day and night independent of the color and position indications obtained from the light beams.

It is plainly evident that for any signal indication, the deflector G will be in such a position that only light of the color corresponding to the correct indication can issue from the signal and hence the possibility of phantom indications is entirely eliminated.

In Fig. 3 I show an alternate method of arranging the prisms G² for producing the same effect as explained above. A possible advantage of this arrangement is increased visibility at short range.

If it is desired to obtain a solid rectangle of light instead of alternating dark and light areas, this result may be obtained as shown in Fig. 4. In this arrangement the light from lamp L' is projected from the signal by prisms G² disposed exactly as in Fig. 3 while a second source L is arranged in combination with a second series of prisms Z to project a beam in the same direction. It is clear from the drawings, that one prism Z is interposed between each two prisms G² and oppositely disposed thereto. The prisms Z and G² could be supported at their ends in an open rectangular frame 90 provided at one end with an arm 91 attached to the operating shaft H. The indication displayed by this structure is, of course, a solid area of light. If adapted to the signal shown in Figs. 1 and 2, an auxiliary lamp would be provided for each of those now present and oppositely disposed thereto. The positions of these auxiliary lamps are indicated by the lenses F⁴, F⁵ and F⁶, shown in dotted lines on Fig. 2.

With this arrangement it would be possible to focus one lens unit to obtain a very intense beam of light for long range and then to focus the second unit for wide spread for better short range indication.

Although I have herein shown and described only one form of signal embodying my invention, and two modifications thereof it is understood that various changes and modifications may be made therein within the scope of the appended claims without departing from the spirit and scope of my invention.

Having thus described my invention, what I claim is:

1. A light signal comprising a casing having an opening, a plurality of light sources, means for projecting from each source an original beam of parallel rays of distinctively colored light, and an oblong light deflector pivotally mounted for movement, means for rotating said deflector into a plurality of different positions in each of which it redirects a different one of said original beams through said opening in an ultimate beam of elongated cross section having a distinctive angular position.

2. A light signal comprising a casing having an opening, a plurality of light sources, means for projecting from each source an original beam of parallel rays, and an oblong light deflector pivotally mounted for movement, means for rotating said deflector into a plurality of different positions in each of which it redirects a different one of said original beams through said opening in an ultimate beam of elongated cross section having a distinctive angular position.

3. A light signal comprising a casing having an opening, a plurality of pairs of light sources disposed around an axis, the two sources of each pair being diametrically opposite each other, means associated with each source for projecting therefrom towards said axis an original beam of parallel rays, and a light deflector pivotally mounted for rotation about said axis, means for rotating said deflector into a plurality of positions in each of which it redirects the beams from a different pair of said sources through said opening in an ultimate beam of elongated cross section having a different angular position, said deflector comprising a group of spaced prisms for redirecting the beam from one source of each pair and a second group of spaced prisms interspersed between the prisms of the first group for redirecting the beam from the other source of each pair.

4. A light signal comprising a casing having an opening, a plurality of light sources, means for projecting from each source an original beam of parallel rays of distinctively colored light, and an oblong light deflector comprising a plurality of parallel prisms and pivotally mounted for movement, means for rotating said deflector into a plurality of different positions in each of which it redirects a different one of said original beams through said opening in an ultimate beam of elongated cross section having a distinctive angular position.

In testimony whereof I affix my signature.

CLARENCE S. SNAVELY.